(12) United States Patent
Fujie et al.

(10) Patent No.: US 8,901,865 B2
(45) Date of Patent: Dec. 2, 2014

(54) CURRENT LIMITING DEVICE FOR VEHICLE

(75) Inventors: Kenichi Fujie, Chiyoda-ku (JP); Shogo Matsuoka, Chiyoda-ku (JP); Katsuya Tsujimoto, Chiyoda-ku (JP); Takamasa Asai, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 633 days.

(21) Appl. No.: 12/900,841

(22) Filed: Oct. 8, 2010

(65) Prior Publication Data
US 2011/0234127 A1  Sep. 29, 2011

(30) Foreign Application Priority Data

Mar. 23, 2010 (JP) ................................. 2010-065905

(51) Int. Cl.
*H02P 27/00* (2006.01)
*H02P 27/06* (2006.01)
*H02P 29/02* (2006.01)
*H02P 9/00* (2006.01)

(52) U.S. Cl.
CPC .............. *H02P 29/022* (2013.01); *H02P 27/06* (2013.01); *H02P 2009/002* (2013.01)
USPC .................... 318/400.3; 318/400.01; 318/700

(58) Field of Classification Search
USPC .................................. 318/400.01, 400.3, 700
See application file for complete search history.

(56) References Cited

U.S. PATENT DOCUMENTS 5,717,303 A * 2/1998 Engel ............................ 318/376
6,078,609 A 6/2000 Nago
6,384,567 B1 * 5/2002 Maeda .......................... 318/801
6,525,495 B2 * 2/2003 Bianchi ........................ 318/381
2003/0052643 A1 * 3/2003 Sweo ............................ 318/801
2006/0137651 A1 * 6/2006 Kishibata et al. ............. 123/352
2007/0285233 A1 12/2007 Inomata et al.

(Continued)

FOREIGN PATENT DOCUMENTS

JP          01206747 A    8/1989
JP          7231651 A     8/1995

(Continued)

OTHER PUBLICATIONS

Japanese Office Action (Notification of Reason for Refusal) dated Apr. 9, 2012, issued in corresponding Japanese Patent Application No. 2010-065904. (6 pages).

(Continued)

*Primary Examiner* — Kawing Chan
(74) *Attorney, Agent, or Firm* — Sughrue Mion, PLLC

(57) ABSTRACT

A current limiting device includes a switching portion, a reflux portion connected to a connection point of the switching portion and an output terminal, and supplying a current to a motor generator while the switching portion is cutting off the current, a current measurement portion that measures the current flowing from the output terminal to the motor generator, and a current control portion that controls the switching portion to switch ON/OFF according to a current value measured by the current measurement portion. When the motor generator is motor-driven using electric power of a condenser, the current control portion limits the current to the motor generator by controlling the switching portion to switch ON/OFF in a case where the measured current value is equal to or exceeds a predetermined current value.

11 Claims, 4 Drawing Sheets

(56) References Cited

U.S. PATENT DOCUMENTS

| | | | |
|---|---|---|---|
| 2008/0224643 A1* | 9/2008 | Sakurai et al. | 318/471 |
| 2009/0049463 A1* | 2/2009 | Ueda | 720/695 |
| 2009/0261761 A1* | 10/2009 | Yoshioka | 318/139 |
| 2009/0289587 A1* | 11/2009 | Baba et al. | 318/400.11 |
| 2010/0026355 A1* | 2/2010 | Yokai et al. | 327/162 |
| 2010/0045225 A1* | 2/2010 | Niesing et al. | 318/434 |

FOREIGN PATENT DOCUMENTS

| | | |
|---|---|---|
| JP | 09172394 A | 6/1997 |
| JP | 9322314 A | 12/1997 |
| JP | 11046483 A | 2/1999 |
| JP | 11075386 A | 3/1999 |
| JP | 2001168771 A | 6/2001 |
| JP | 2002216818 A | 8/2002 |
| JP | 2002320271 A | 10/2002 |
| JP | 2003256070 A | 9/2003 |
| JP | 2005318700 A | 11/2005 |
| JP | 2006-25488 A | 1/2006 |
| JP | 2007-159353 A | 6/2007 |
| JP | 2007327883 A | 12/2007 |
| JP | 2009033938 A | 2/2009 |

OTHER PUBLICATIONS

Japanese Office Action dated Oct. 16, 2012, issued in corresponding Japanese Patent Application No. 2010-065905.

* cited by examiner

CURRENT LIMITING DEVICE FOR VEHICLE

BACKGROUND OF THE INVENTION

1. Field of the Invention

The present invention relates to a current limiting device for vehicle suitable for a vehicle provided with a motor generator not incorporating a high-capacity smoothing capacitor and a current sensor.

2. Background Art

JP-A-2006-25488 discloses that drive torque and generated output of a motor generator in a practical rotation region are better with a rotary electric machine using a coil wiring having a larger wire diameter and a smaller winding number, that is, a low-impedance coil wiring. Also, an increase of a voltage at a drive power supply of the motor allows a larger amount of current to flow, which increases drive torque. Hence, there can be achieved an advantage that the engine can start promptly and drive torque in a high rotation region is enhanced. By combining a high-voltage source and a motor generator using a low-impedance coil wiring, advantages of the both components can be utilized effectively without impairing each other.

Meanwhile, JP-A-2007-159353 discloses a method of achieving a simpler configuration and a size reduction by not only omitting a high-capacity smoothing capacitor and a current sensor by controlling a switching element in an inverter of a motor generator to switch ON and OFF using a rectangular wave drive method but also combining the inverter and a rotary electric machine into one unit. Besides a high-voltage source and a low-impedance coil wiring, by making the configuration of the motor generator simpler, a loss caused by wiring resistance between the inverter and the rotary electric machine can be lessened. It thus becomes possible to construct a more efficient system.

When the motor generator is motor-driven using a high-voltage source, however, a current equal to or exceeding a rated current of the coil wiring or a rated current of the switching element in the inverter of the motor generator flows in a very low rotation region. This raises a problem that the motor generator is broken.

In addition, as has been described above, the motor generator of a simpler configuration has no current sensor. Moreover, by combining the inverter and the rotary electric machine into one unit, these components are directly connected to the engine. Because a mounting space is strictly limited, there is no room to provide an additional current sensor on the motor generator. This raises a problem that neither can a bus current be detected nor can a current be limited.

Further, when the current limiting device is installed in the vicinity of the high-voltage source, for example, in a luggage room, the wiring becomes longer and surge energy caused by wiring inductance consequently increases. Accordingly, there is a need to increase a capacity of a surge absorbing capacitor of the motor generator, and this need raises a problem that the size is increased.

SUMMARY OF THE INVENTION

The invention was devised in view of the problems discussed above and has an object to provide a current limiting device for vehicle that limits a current when a motor generator having a low-impedance coil wiring and combined with a high-voltage source is motor-driven, so that an eddy current does not flow into the motor generator.

A current limiting device for vehicle according to one aspect of the invention is connected to a condenser at an input terminal and to a motor generator at an output terminal. The current limiting device for vehicle includes: a switching portion that passes and cuts off a current from the input terminal to the output terminal; a reflux portion that is connected to a connection point of the switching portion and the output terminal and supplies the current to the motor generator while the switching portion is cutting off the current; a current measurement portion that measures the current flowing from the output terminal to the motor generator; and a current control portion that controls the switching portion to switch ON and OFF according to a current value measured by the current measurement portion. When the motor generator is rotary driven using electric power of the condenser, the current control portion limits the current to the motor generator by controlling the switching portion to switch ON and OFF in a case where the measured current value is equal to or exceeds a predetermined current value.

According to the invention, before a current flowing into the motor generator reaches or exceeds a rated current of the coil wiring of the motor generator or a rated current of the switching element in the inverter of the motor generator, the current can be limited by the current limiting device for vehicle. It thus becomes possible to eliminate a risk that the motor generator is broken.

Also, by keeping the switching portion switched ON while the motor generator is motor-driven in a practical rotation region in which a current equal to or exceeding a predetermined value does not flow or while it is generating electric power, a loss in the current limiting device for vehicle can be minimized. The current limitation therefore does not interfere with the driving and electric power generation operations of the motor generator.

The foregoing and other object, features, aspects, and advantages of the present invention will become more apparent from the following detailed description of the present invention when taken in conjunction with the accompanying drawings.

DESCRIPTION OF PREFERRED EMBODIMENTS

Figure 1:
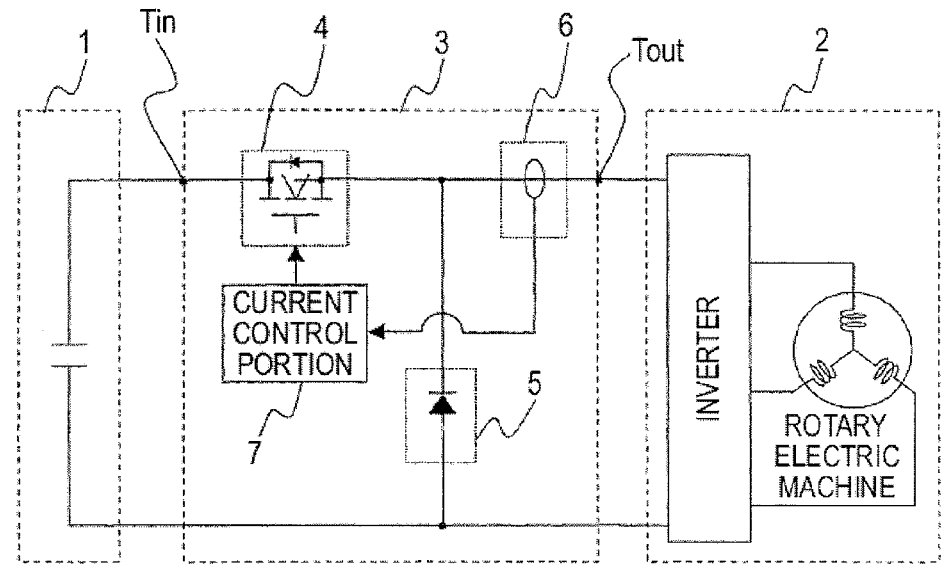
FIG. 1 is a block diagram showing the configuration of a first embodiment of the invention.

Hereinafter, embodiments of the invention will be described in detail with reference to the drawings. It should be noted that like components are labeled with like reference numerals in the respective drawings.

First Embodiment

FIG. 1 is a view showing the configuration of a current limiting device for vehicle according to a first embodiment of the invention. A current limiting device 3 for vehicle is connected to a high potential end of a condenser 1 at an input terminal Tin and to a high potential end of a motor generator 2 at an output terminal Tout. The current limiting device 3 for vehicle includes therein a switching portion 4 that passes and cuts off a current from the input terminal Tin to the output terminal Tout and a reflux portion 5 that supplies a circulating current to the motor generator 2 while the switching portion 4 is cutting off a current. Further, the current limiting device 3 for vehicle includes therein a current measurement portion 6 that measures a current flowing from the output terminal Tout to the motor generator 2 and a current control portion 7 that controls the switching portion 4 to switch ON and OFF according to a current value measured by the current measurement portion 6.

Referring to FIG. 1, the condenser 1 can be a component typically used as a power supply for automobile, such as a lead battery, a lithium-ion battery, and an electric double layer capacitor. The switching portion 4 can be an IGBT or a P-type MOSFET. Also, the reflux device 5 can be a diode or an N-type MOSFET. In a case where an N-type MOSFET is used, a loss by reflux can be lessened by subjecting the current to synchronous rectification while the current is circulating. The current measurement portion 6 can be a DC current sensor, for example, a DC-CT.

Figure 3:
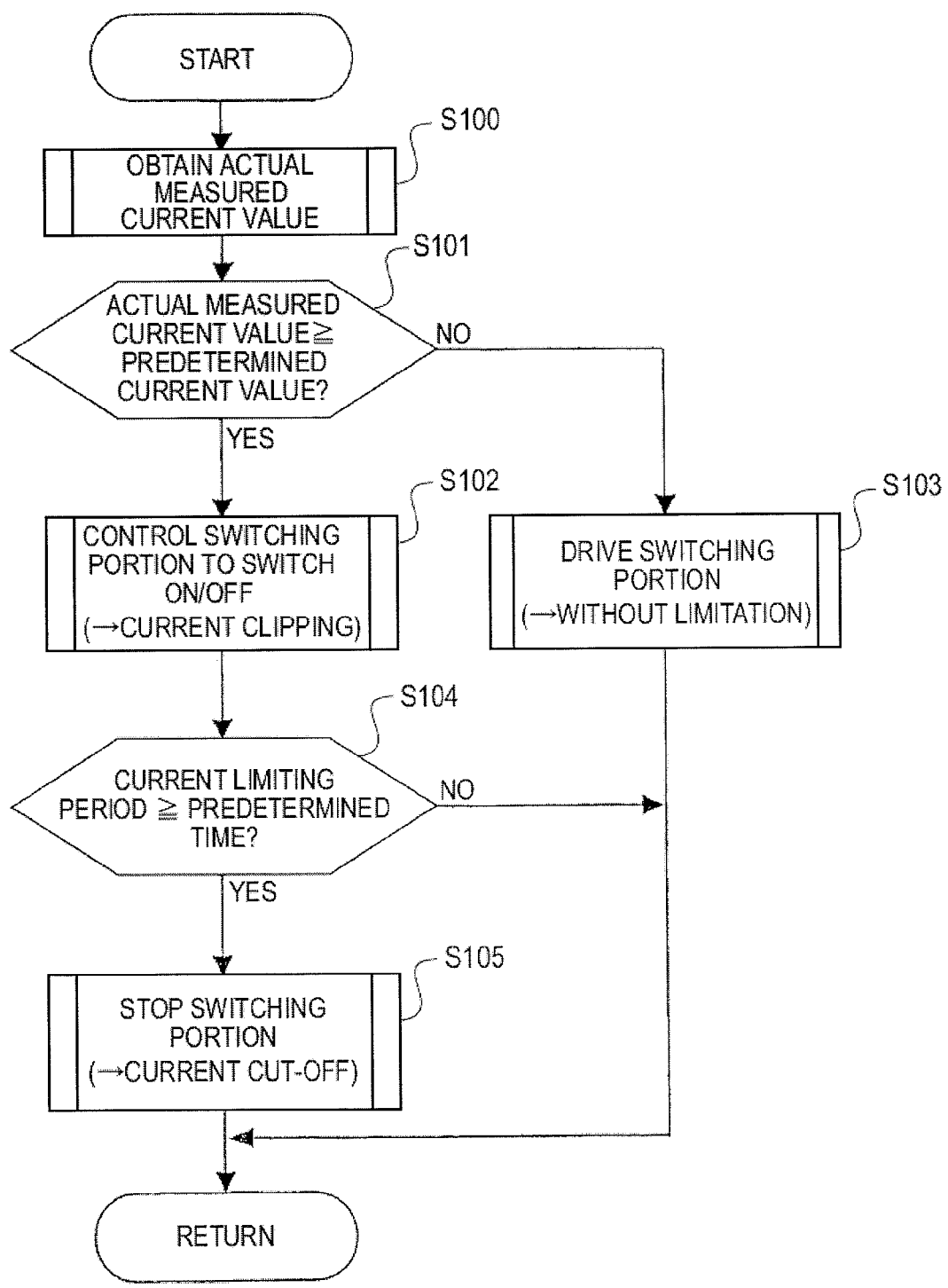
FIG. 3 is a flowchart depicting an operation of a current control portion of the first embodiment.

An operation of the current control portion 7 of FIG. 1 will now be described in detail using the flowchart of FIG. 3.

Initially, in Step S100, a current value measured by the current measurement portion 6 is obtained. Herein, assume that a negative or positive sign is assigned to the current value according to a direction in which the current flows and a direction in which the current flows when the motor generator 2 is rotary driven using electric power of the condenser 1 is assigned with a positive sign.

In Step S101, the measured current value is compared with a predetermined current value set in advance. In a case where the measured current value is equal to or exceeds the predetermined current value, it is determined that current limitation is necessary and the flow proceeds to Step S102 to carry out a current limiting process by controlling the switching portion 4 to switch ON and OFF. Meanwhile, in a case where the measured current value is smaller than the predetermined current value, it is determined that current limitation is not necessary. The switching portion 4 is therefore kept switched ON, that is, kept energized in Step S103.

The predetermined current value can be set according to a rated current of the coil wiring of the motor generator 2 or a rated current of a switching element used in an inverter of the motor generator 2. For example, the predetermined current value can be set to 80% of the rated current of the coil wiring. Also, in the current limiting process in Step S102, the control to switch ON and OFF the switching portion 4 can be the PWM control by which a conductive rate of the switching element is varied by changing an ON/OFF time ratio in a constant carrier cycle.

In Step S104, in a case where the current is limited, when a period during which the current is limited is as long as or longer than a pre-set time, it is determined that an abnormality of some sort, such as a short circuit between the power supply and the GND, is occurring in the motor generator 2. The flow therefore proceeds to Step S105 in which the switching portion 4 is switched OFF, that is, the current is cut off. When the current limiting period is shorter than the pre-set time, the process ends without any operation.

Figure 4:
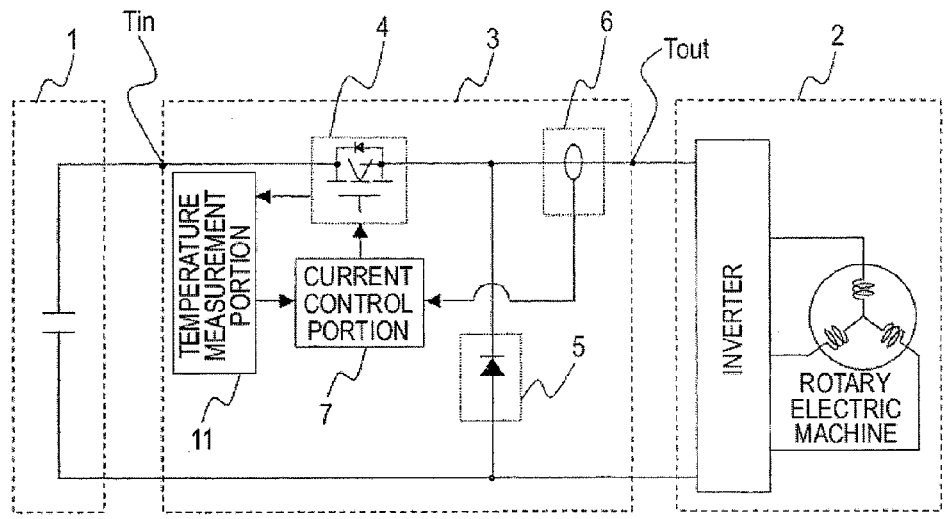
FIG. 4 is a block diagram showing a modification of the configuration of the first embodiment of the invention.

Regarding the setting of the pre-set time, for example, a relation between a temperature rise of the switching portion 4 and a time during the current limitation is preliminarily checked and the pre-set time is set according to a time needed for the switching portion 4 to reach the upper limit of a usable temperature range. Alternatively, as is shown in FIG. 4, a temperature measurement portion 11 that monitors the temperature of the switching portion 4 may be provided in the current limiting device 3 for vehicle to input the temperature measured by the temperature measurement portion 11 into the current control portion 7, so that the current control portion switches OFF the switch portion 4 when the measured temperature is equal to or exceeds a predetermined value set according to the upper limit of the usable temperature range of the switching portion 4.

The temperature measurement portion 11 can be, for example, a thermistor, a thermocouple, or a measurement circuit using such elements.

Figure 5:
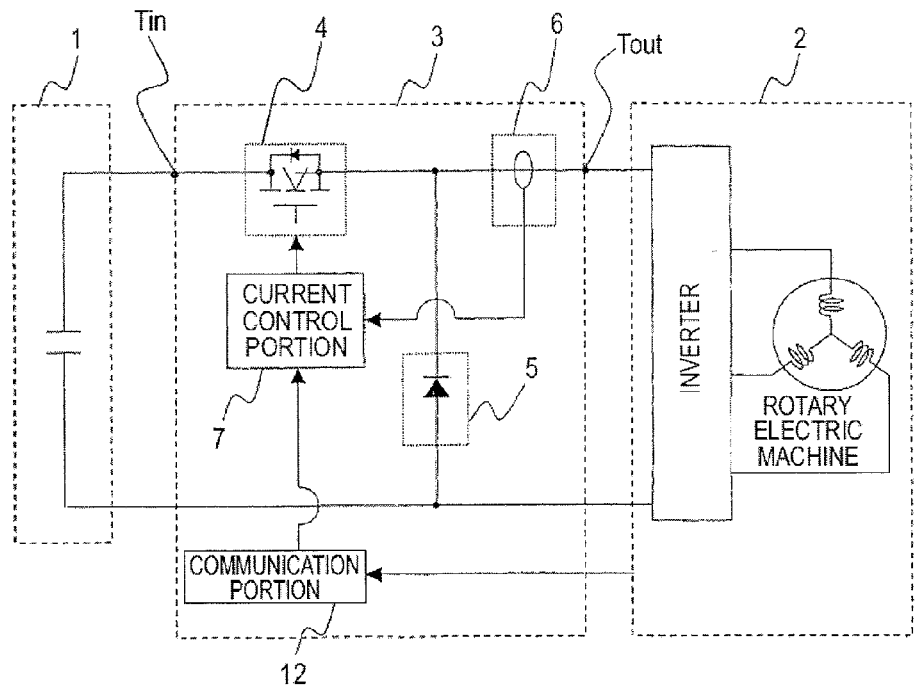
FIG. 5 is a block diagram showing another modification of the configuration of the first embodiment of the invention.

Besides the foregoing methods, the switching portion 4 may be switched OFF at the occurrence of an abnormality in the motor generator 2. For example, as is shown in FIG. 5, a communication portion 12 that obtains a signal from the motor generator 2 may be provided in the current limiting device 3 for vehicle to input the signal obtained by the communication portion 12 into the current control portion 7, so that the current control portion 7 switches OFF the switching portion 4 when the obtained signal from the motor generator 2 satisfies a predetermined condition.

The signal obtained from the motor generator 2 can be a signal indicting, for example, a temperature of the coil wiring of the motor generator 2, a temperature of the switching element in the inverter, or a short-circuit failure or an open failure of the switching element in the inverter. The predetermined condition can be such that the switching portion 4 is switched OFF when the temperature of the coil wiring of the motor generator 2 or the temperature of the switching element in the inverter reaches or exceeds a predetermined value set according to the upper limit of the usable temperature of the coil wiring of the motor generator 2 or of the switching element in the inverter. Alternatively, the switching portion 4 may be switched OFF in a case where a signal indicating a short-circuit failure or an open failure of the switching element in the inverter is obtained.

The predetermined value set according to the upper limit of the usable temperature can be set, for example, to 80% of the upper limit of the usable temperature of the switching element. The communication portion 12 may be a scheme using a CAN, a LIN, or a communication protocol, such as a serial communication, or a binary signal of Hi and Lo or an analog voltage signal proportional to a temperature.

While an operation of the current control portion 7 when the motor generator 2 is rotary driven using electric power of the condenser 1 has been chiefly described, it should be appreciated, however, that the sign of the current is negative when the motor generator 2 is generating electric power. Hence, according to the flowchart of FIG. 3, because the actual measured current value is smaller than the predetermined current value, the switching portion 4 is kept switched ON, that is, it is kept energized. Hence, the operation descried above does not interfere with the power generation operation of the motor generator 2.

As has been described, according to the configuration of the first embodiment, a threshold value on the basis of which to perform the current limitation is set in advance according to the rated current of the coil wiring of the motor generator or the rated current of the switching element in the inverter of the motor generator. Hence, when the motor generator is motor-driven using a high-voltage source, the current is limited before the current reaches or exceeds the rated current of the coil wiring or the rated current of the inverter. This configuration therefore eliminates a concern that the motor generator is broken by burnout.

Also, because the current limitation is carried out by the switching method in the first embodiment, there can be achieved an advantage that less heat is generated than current limitation using a resistive element.

Further, by keeping the switching portion switched ON while the motor generator is motor-driven in a practical rotation region in which a current equal to or exceeding the threshold value does not flow and while it is generating electric power, a loss in the current limiting device for vehicle can be minimized. The current limitation therefore does not interfere with the driving and electric power generation operations of the motor generator.

In addition, by assigning the positive or negative sign according to the current flowing direction, a need to change the control program depending on whether the motor generator is driven or generating electric power can be eliminated. It thus becomes possible to make the program simpler and reduce a ROM capacity.

Further, the current is cut off upon detection of various types of abnormalities, such as by switching OFF the switching portion when the current limiting time is equal to or exceeds a predetermined value, by obtaining the temperature of the coil wiring of the motor generator or the temperature of the switching element in the inverter and switching OFF the switching portion when the obtained temperature is equal to or exceeds a predetermined value, or by switching OFF the switching portion when a signal accompanying an abnormality of the motor generator is obtained. The invention can be therefore used also to safeguard a power line against short circuit.

According to the method using the predetermined time described above, because a temperature sensor or the like can be omitted, the configuration can be simpler. Meanwhile, according to the method using the temperature described above, there can be achieved an advantage that detection accuracy is higher than accuracy by the time-based detection.

Figure 6:
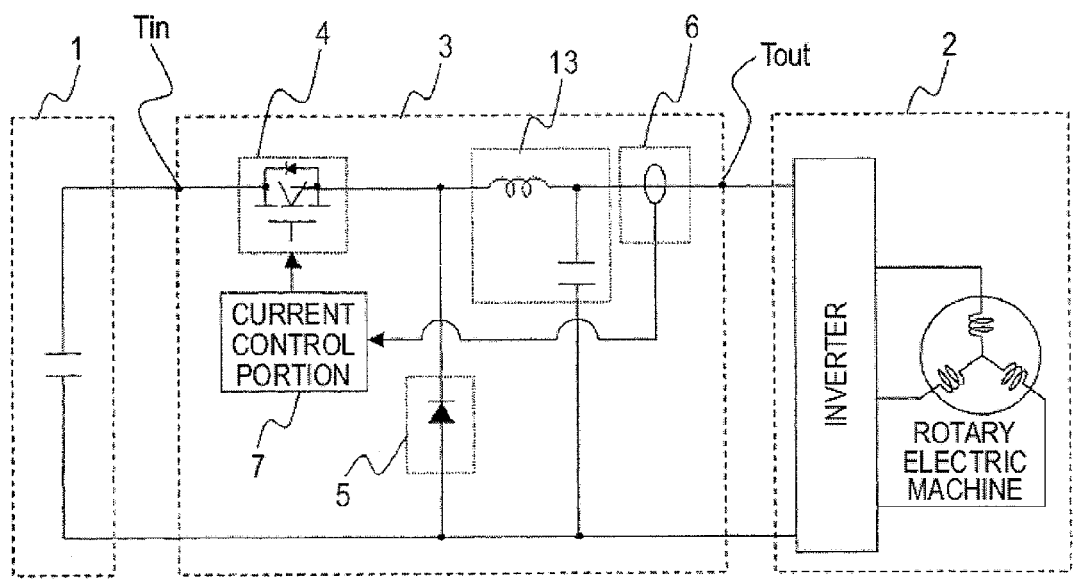
FIG. 6 is a block diagram showing still another modification of the configuration of the first embodiment of the invention.

The first embodiment of the invention has been described by chiefly focusing on the current limitation by controlling the switching portion 4 to switch ON and OFF. According to the configuration of the first embodiment, however, the voltage at the output terminal Tout fluctuates considerably when the switching portion 4 is controlled to switch ON and OFF. This is not preferable for the motor generator that uses a voltage for an abnormality detection. To avoid this inconvenience, as is shown in FIG. 6, it may be configured in such a manner that an output voltage smoothing portion 13 is provided to an output stage of the current limiting device 3 for vehicle to lessen a voltage fluctuation. The output voltage smoothing portion 13 can be, for example, a low-pass filter formed of a choke coil and a capacitor. By adding the output voltage smoothing portion 13 in this manner, not only does it become possible to stabilize the voltage at the output terminal Tout, but it also becomes possible to obtain an advantage same as the advantage of the configuration of FIG. 1.

Second Embodiment

Figure 2:
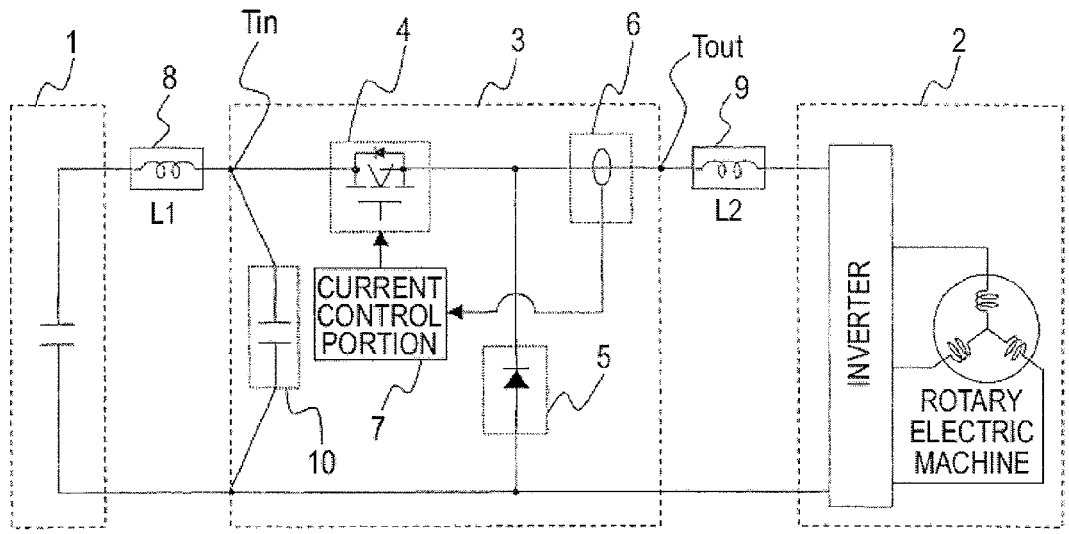
FIG. 2 is a block diagram showing the configuration of a second embodiment of the invention.

FIG. 2 shows the configuration of a current limiting device for vehicle according to a second embodiment of the invention. In comparison with the first embodiment above, an input voltage smoothing portion 10 is additionally provided. Hereinafter, a detailed description will be given.

Referring to FIG. 2, the current limiting device 3 for vehicle is connected to a high potential end of the condenser 1 at the input terminal Tin via a wiring 8 (inductance L1) and to a high potential end of the motor generator 2 at the output terminal Tout via a wiring 9 (inductance L2). In the current limiting device 3 for vehicle, the input voltage smoothing device 10 is connected to the input terminal Tin at one end and to a low potential end terminal of the condenser 1 or the vehicle body earth at the other end. The input voltage smoothing portion 10 can be, for example, a capacitor.

The input voltage smoothing portion 10 absorbs surge energy at the input terminal Tin generated by the inductance L1 of the wiring 8 during the current limitation, particularly, at the timing at which the switching portion 4 is switched from ON to OFF and thereby functions as a surge protection circuit of the switching portion 4. Even in a case where the current limitation is not performed, the input voltage smoothing portion 10 also absorbs surge energy generated by the inductance L1 of the wiring 8 at the timing at which the switching element in the inverter of the motor generator 2 is switched from ON to OFF. It is therefore sufficient to design the surge protection circuit so as to absorb only the surge energy generated by the inductance L2 of the wiring 9 at the end of the motor generator 2.

By installing the current limiting device 3 for vehicle in the vicinity of the motor generator 2, it becomes possible to lessen the inductance L2 of the wiring 9, which can in turn reduce the surge energy generated by the inductance L2. An installment place of the current limiting device 3 for vehicle can be determined, for example, by determining installment places of the high-voltage source and the motor generator 2 first and then by installing the current limiting device 3 for vehicle so that magnitudes of the inductances of the wirings 8 and 9 satisfy L1$\gg$L2.

As has been described, according to the configuration of the second embodiment, surge energy generated by the wiring inductance between the high-voltage source and the motor generator can be reduced by installing the current limiting device for vehicle in the vicinity of the motor generator. Hence, because a need to add a high-capacity smoothing capacitor to the motor generator can be eliminated, there can be achieved an advantage that the size of the motor generation does not have to be increased.

The invention relates to a high-voltage system aiming at enhancing drive torque and power generation efficiency by combining a high-voltage source and a motor generator using a low-impedance coil wiring. The invention is particularly suitable for a current limiting device for vehicle that limits a drive current when a motor generator is motor-driven in a vehicle provided with a motor generator not incorporating a high-capacity smoothing capacitor and a current sensor and adopting the rectangular wave driving method with the aim of achieving a simpler configuration and a size reduction.

Various modifications and alterations of this invention will be apparent to those skilled in the art without departing from the scope and spirit of this invention, and it should be understood that this is not limited to the illustrative embodiments set forth herein.

What is claimed is:

1. A current limiting device for vehicle connected to a condenser at an input terminal and to a motor generator at an output terminal, comprising:
   a switching portion that passes and cuts off a current from the input terminal to the output terminal;
   a reflux portion that is connected to a connection point of the switching portion and the output terminal and supplies the current to the motor generator while the switching portion is cutting off the current;

a current measurement portion that measures the current flowing from the output terminal to the motor generator; and a current control portion that controls the current between the condenser and the motor generator by alternately switching the switching portion ON and OFF by use of PWM control by which a conductive rate of the switching portion is varied by changing an ON/OFF time ratio in a constant carrier cycle, according to a current value measured by the current measurement portion, wherein, when the motor generator is rotary driven using electric power of the condenser, the current control portion limits the current to the motor generator by controlling the switching portion to alternately switch, during each cycle of the current measurement by the current measurement portion, the switching portion ON and OFF in a case where the measured current value is equal to or exceeds a first current value, and when the motor generator generates power, the current control portion keeps the switching portion ON.

2. The current limiting device for vehicle according to claim 1, wherein:

the first current value is a value set according to a rated current of a coil wiring of the motor generator.

3. The current limiting device for vehicle according to claim 1, wherein:

the first current value is a value set according to a rated current of a switching element used in an inverter of the motor generator.

4. The current limiting device for vehicle according to claim 1, wherein:

the current control portion controls the switching portion to switch OFF in a case where a time over which the current is limited by the switching portion is equal to or exceeds a predetermined value.

5. The current limiting device for vehicle according to claim 1, further comprising:

a temperature measurement portion that measures a temperature of the switching portion, wherein the current control portion obtains a temperature outputted from the temperature measurement portion and controls the switching portion to switch OFF in a case where the temperature of the switching portion is equal to or exceeds a predetermined value.

6. The current limiting device for vehicle according to claim 1, further comprising:

a communication portion that communicates with the motor generator and obtains a signal from the motor generator, wherein the current control portion controls the switching portion to switch OFF in a case where the current control portion obtains a signal accompanying an abnormality of the motor generator from the communication portion.

7. The current limiting device for vehicle according to claim 6, wherein:

the current control portion obtains a temperature of a coil wiring of the motor generator from the communication portion and controls the switching portion to switch OFF in a case where the temperature of the coil wiring is equal to or exceeds a predetermined value.

8. The current limiting device for vehicle according to claim 6, wherein:

the current control portion obtains a temperature of a switching element in an inverter of the motor generator from the communication portion and controls the switch portion to switch OFF in a case where the temperature of the switching element is equal to or exceeds a predetermined value.

9. The current limiting device for vehicle according to claim 1, wherein:

the current value measured by the current measurement portion has one of positive and negative signs depending on a direction in which the current flows.

10. The current limiting device for vehicle according to claim 1, further comprising:

an output voltage smoothing portion that smoothens an output voltage of the switching portion so as to lessen an output voltage fluctuation when the switching portion is controlled to switch ON and OFF.

11. A vehicle that incorporates the current limiting device for vehicle set forth in claim 1, wherein:

the current limiting device for vehicle further comprises an input voltage smoothing portion that is connected to the condenser by a wiring having wiring inductance L1 and to the motor generator by a wiring having wiring inductance L2 and smoothens a voltage at the input terminal generated by the wiring inductance L1 and switching of the switching portion; and the current limiting device for vehicle is installed in the vehicle so that the wiring inductance L1 is greater than wiring inductance L2.

* * * * *